June 6, 1967 W. F. KLEMM ET AL 3,323,535
ADJUSTABLE FLOW CONTROL FOR METERED FLOW OF FLUID
Filed March 27, 1964 5 Sheets-Sheet
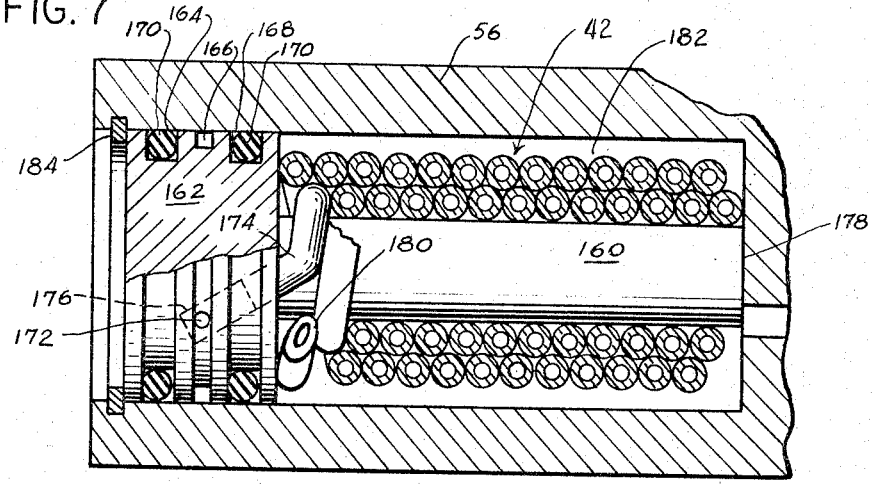
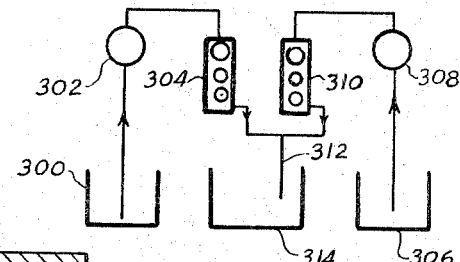
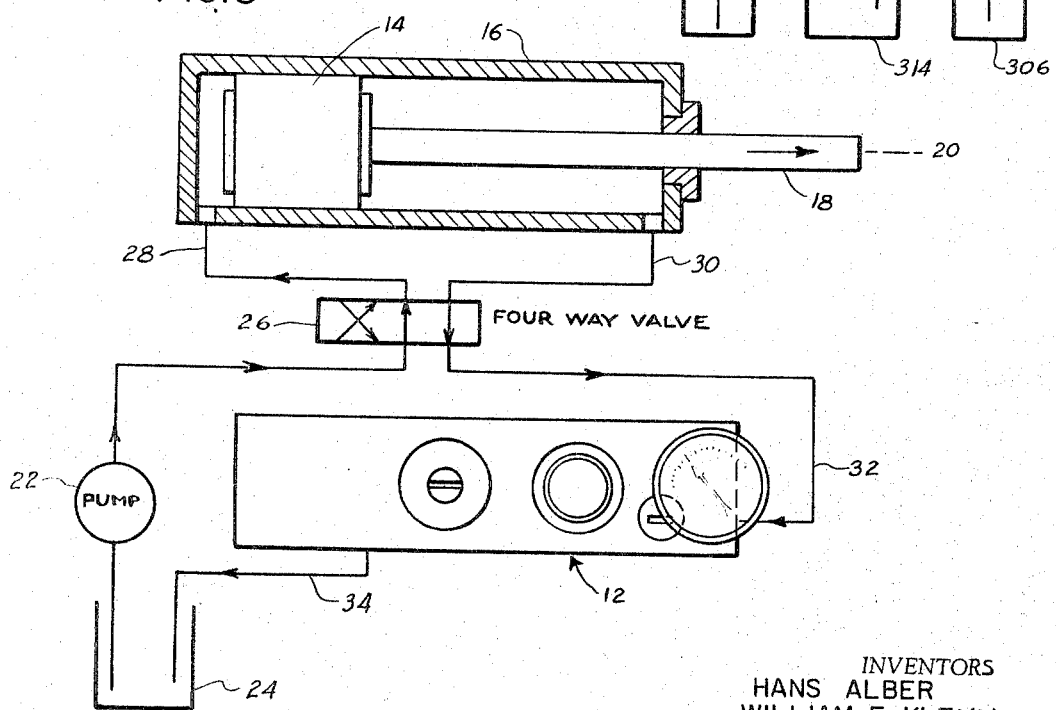
INVENTORS
HANS ALBER
WILLIAM F. KLEMM
BY
ATTORNEYS June 6, 1967  W. F. KLEMM ETAL  3,323,535
ADJUSTABLE FLOW CONTROL FOR METERED FLOW OF FLUID
Filed March 27, 1964  5 Sheets-Sheet 4
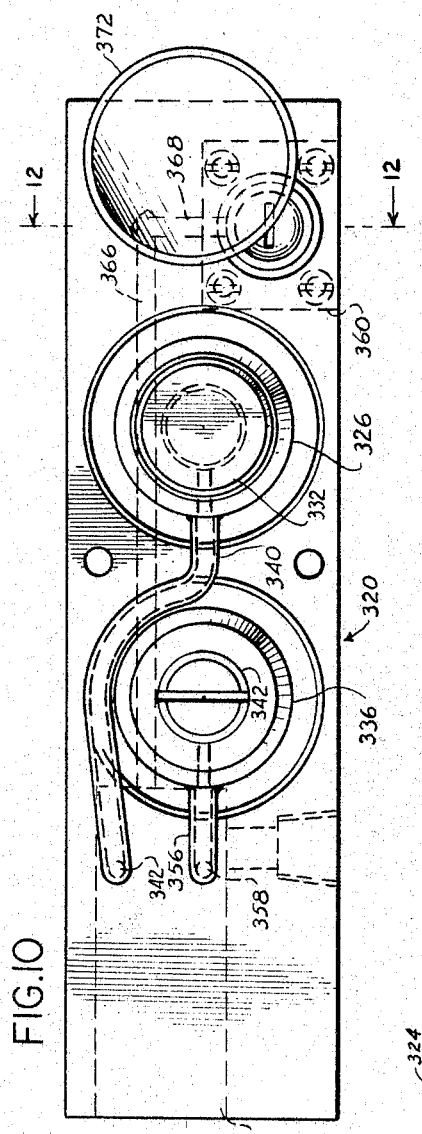
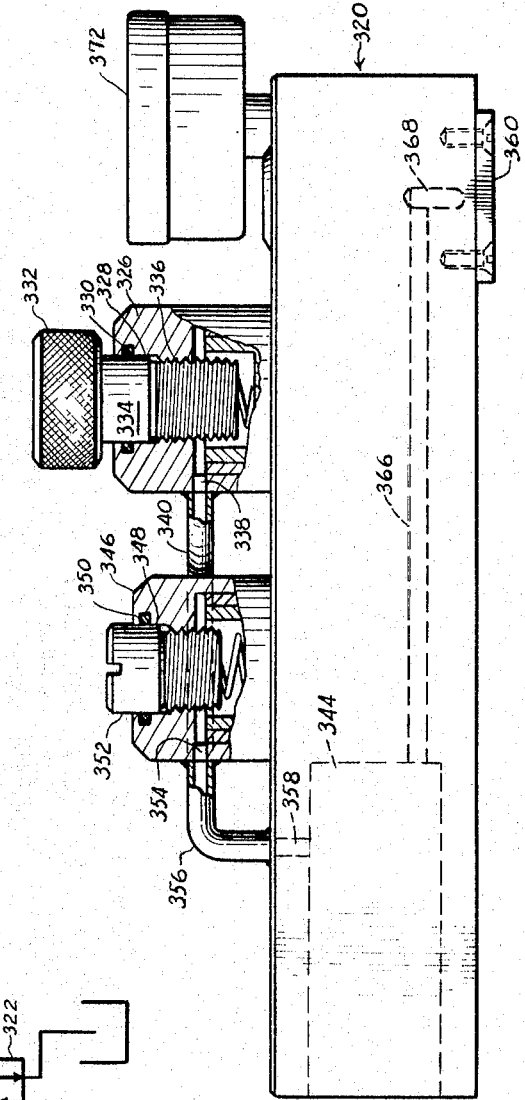
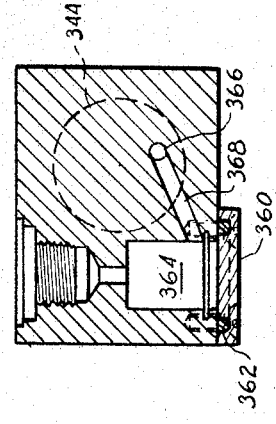
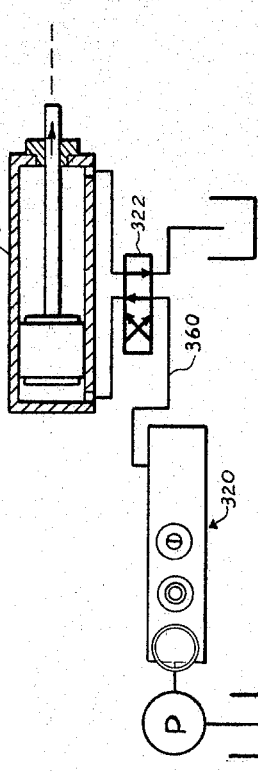
*INVENTORS*
HANS ALBER
WILLIAM F. KLEMM
BY
*James and Franklin*
ATTORNEYS

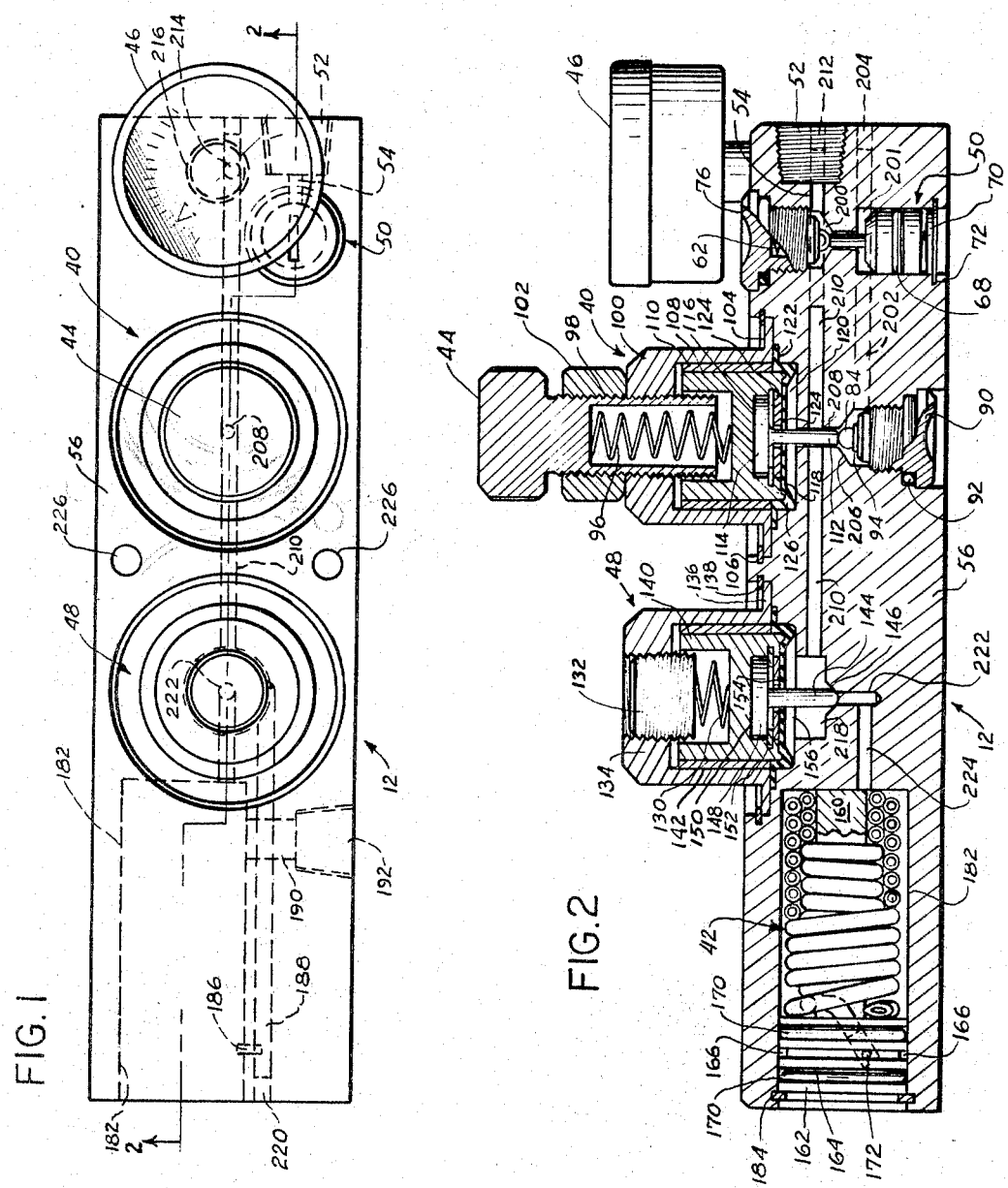
June 6, 1967   W. F. KLEMM ETAL   3,323,535
ADJUSTABLE FLOW CONTROL FOR METERED FLOW OF FLUID
Filed March 27, 1964   5 Sheets-Sheet 1
INVENTORS
HANS ALBER
BY WILLIAM F. KLEMM
ATTORNEYS

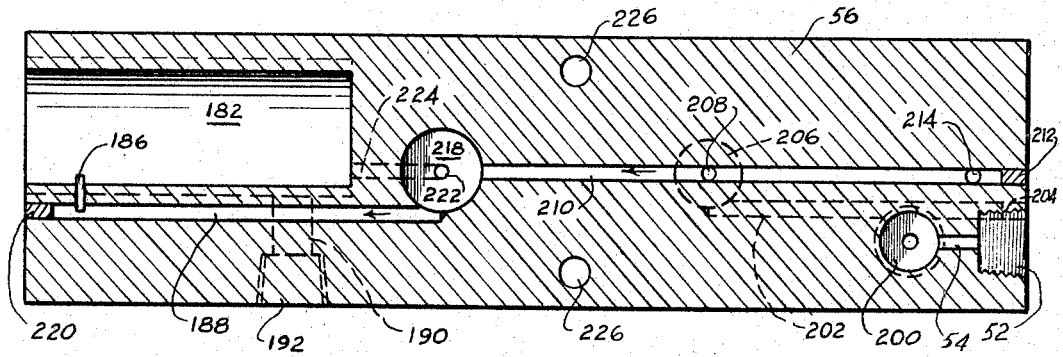
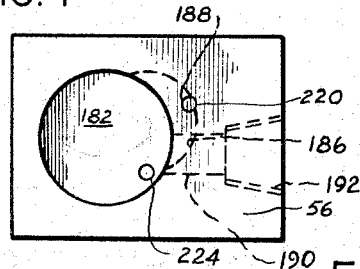
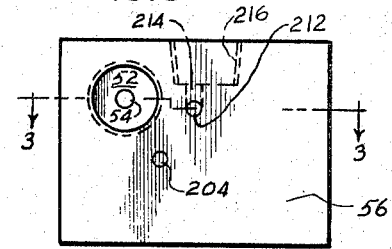
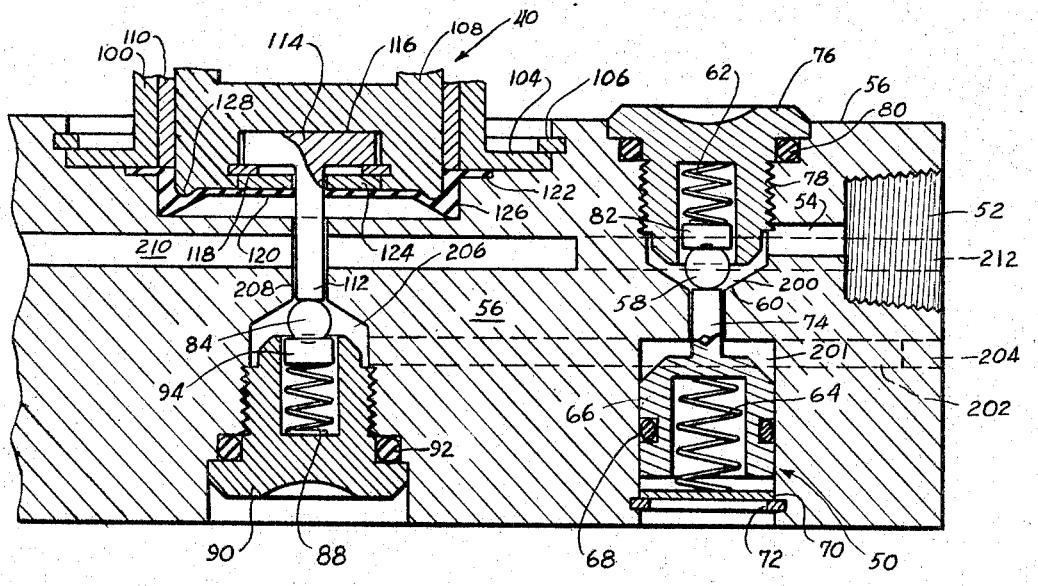

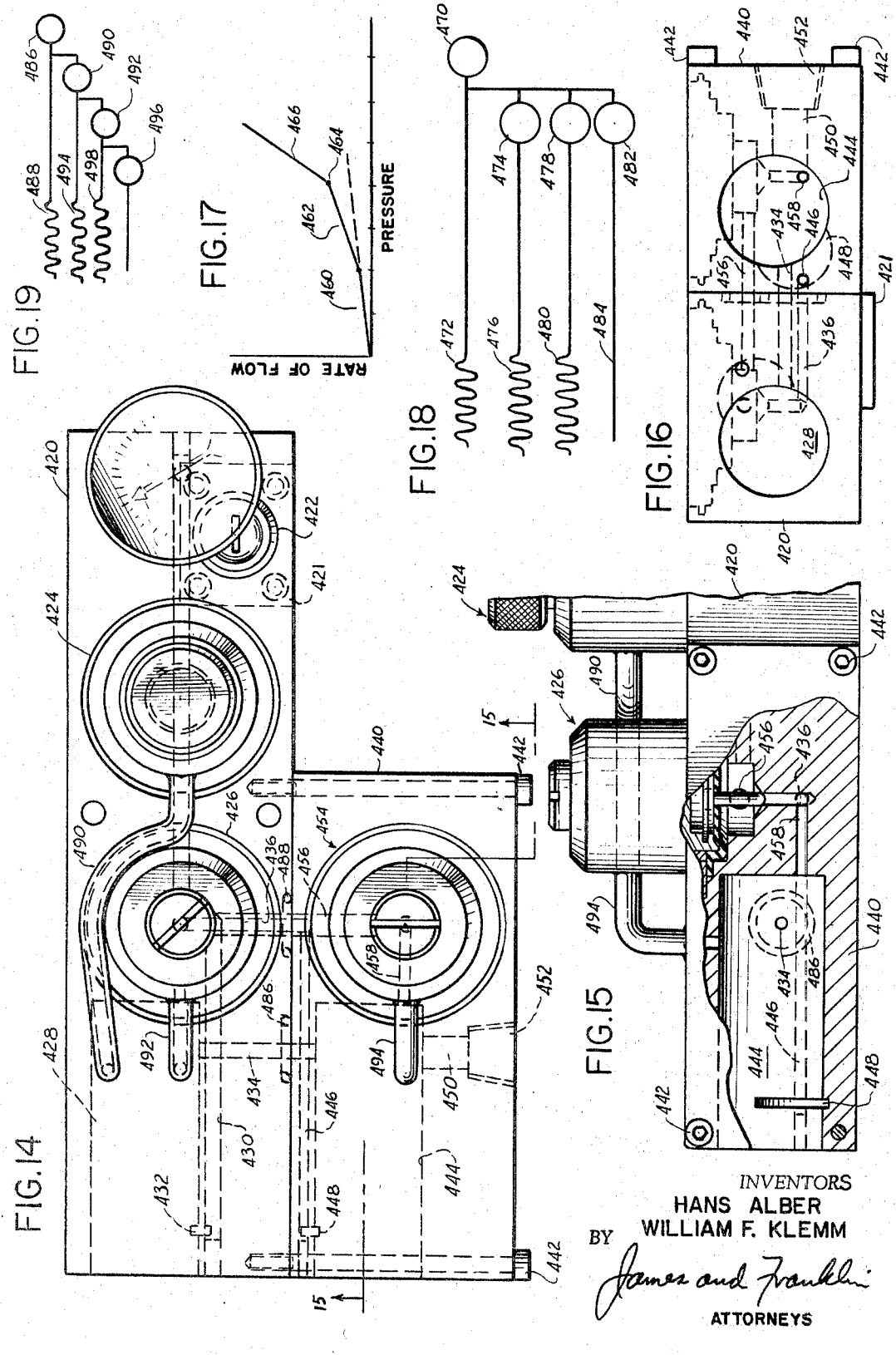

United States Patent Office 3,323,535
Patented June 6, 1967

3,323,535
ADJUSTABLE FLOW CONTROL FOR METERED FLOW OF FLUID
William F. Klemm, Nutley, and Hans Alber, Mountainside, N.J., assignors of one-third to Henry B. Peter, Union, N.J.
Filed Mar. 27, 1964, Ser. No. 355,997
24 Claims. (Cl. 137—110)

This invention relates to flow controls, and more particularly to an adjustable flow control for metered flow of a fluid.

There are many cases in which hydraulic fluid drives a motor or actuator to move a machine part at a controlled slow speed. For example, in machine tools the actuator may powerize the feed movement of a milling machine table, or of the rotating quill of a drill press, and so on.

Heretofore it has been the practice to use a needle valve to provide a highly restricted passage through which the hydraulic fluid must flow. However, with a minute opening such a valve is readily clogged by even small dirt particles. It often has been necessary to use a larger opening than needed, in order to avoid such clogging, and to then use a much larger actuator cylinder than needed, in order to obtain the desired slow motion. Even so there has been difficulty with clogging.

A rotatable eccentric throttle is sometimes used in lieu of a needle valve, but suffers from the same disadvantage in utilizing a very highly constricted opening which is easily clogged.

To overcome this difficulty it has also been proposed to employ two variable speed pumps in opposition, in order to obtain an adjustable small differential flow, but such a system is complex and expensive.

Some machines employ a hydraulic check arranged mechanically in parallel to an actuator. Such a check is an oil filled cylinder with its ends connected through a restrictor valve, but the same difficulty remains in that the adjustable needle valve acting as a restrictor must have a very fine opening, even with a check cylinder larger than otherwise would be needed. A check cylinder employing such a needle valve also suffers from the disadvantage of being very sensitive to temperature change, because of resulting change in viscosity.

The general object of the present invention is to overcome the foregoing difficulties. A more specific object is to cause a very low rate of flow without requiring a needle valve, and without danger of clogging. For this purpose we employ a friction tube of large enough bore to avoid clogging, but long enough to result in a pressure drop which results in a low rate of flow through the tube, which then acts as the desired restrictor. However, such a restrictor is not adjustable like a needle valve, and we further provide a manually adjustable pressure regulator in combination with the restrictor, thereby making it feasible to accurately vary the rate of flow in infinitesmal increments.

The pressure regulator might be provided with a micrometer type of scale, but such a scale would not allow for changes in viscosity or changes in temperature or changes in supply pressure. Instead we fit the adjustable flow control with a pressure gauge which is connected between the adjustable regulator and the restrictor, and such a gauge acts as an indicator which is related to the rate of flow, so that a rate previously found desirable may be repeated by adjusting to the same pressure (within reasonable limits of viscosity).

As so far described, the flow control may go down to exceedingly low rates of flow, but has limited range upward, and in accordance with a further feature and object of the present invention, the range is greatly extended. In the particular example here illustrated the range may be extended from 0.06 up to 160 cubic inches per minute. This is attained by the provision of a by-pass valve or regulator arranged to act as a variable by-pass around the restrictor. In terms of pressure the by-pass remains closed in a range of from say 0 to 40 p.s.i., above which an increase in pressure causes erratic changes in flow through the restrictor, but the by-pass regulator may come into action in a range of from say 40 to 60 p.s.i. It provides a steep increase in flow.

The main supply of hydraulic fluid may vary greatly in pressure, which may place undue operating requirement on the adjustable regulator if it is to maintain the desired sensitivity and accuracy. In preferred form, a preliminary pressure regulator is provided, ahead of the adjustable regulator, and serving to reduce the supply to a desired uniform working pressure. In the illustrated example, the selected working pressure is 100 p.s.i., and the preliminary regulator limits the delivery to the adjustable regulator regardless of the pressure at which the fluid is received. In order for the unit to function, the supply pressure must be equal to or greater than the adjusted pressure of the adjustable regulator.

Another object of the invention is to provide a structure in which the regulators are enclosed and connected to the outlet of the unit, so that the regulators operate under a differential pressure, that is, the pressure above the outlet pressure. Such a unit may be used with high pressures at both inlet and outlet. It may be used to "meter in" as well as to "meter out."

Still another object is to extend the flow control range under gradual control, in contrast with the use of a by-pass regulator from which the increase in flow is rather steep. For this purpose, a second restrictor tube may be employed, this being controlled by a regulator which opens at a higher pressure, that is, at a pressure above which the flow through the first restrictor may become erratic. Similarly a third restrictor may be employed, controlled by a valve which opens at a still higher pressure, to take effect at a point where the flow through the two restrictors may become erratic.

Other objects concern preferred structural features. One such feature is to provide free self-adjustable seating of the stem of the variable by-pass valve on its seat. Another object is to improve the sealing of the movable parts of the regulator, and with this object in view we provide a diaphragm-like seal, but the diaphragm is fully backed by a rigid piston, and the motion of the piston and seal is very slight, thereby minimizing fatigue and breakage of the seal. Another object is to simplify the manufacture of the restrictor and of the complete flow control device, for which purpose we provide a block which receives and forms a part of all three regulators, and which also has a cylindrical chamber which receives the restrictor unit and which provides flow connections to that unit without the need for ordinary pipe connections to the friction tube.

To accomplish the foregoing objects, and other more specific objects which will hereinafter appear, our invention resides in the adjustable flow control device, and the elements thereof, and their relation one to another, as are hereinafter more particularly described in the following specification. The specification is accompanied by drawings in which:

FIG. 1 is a plan view of an adjustable flow control unit embodying features of our invention;

FIG. 2 is a longitudinal section through the unit, taken approximately on the stepped line 2—2 of FIG. 1;

FIG. 3 is a horizontal section through the block, taken approximately on the line 3—3 of FIG. 5;

FIG. 4 is an end view of the block looking toward the left end of FIG. 3;

FIG. 5 is an end view looking toward the right end of FIG. 3;

FIG. 6 is a fragmentary section like the right end portion of FIG. 2, but drawn to larger scale;

FIG. 7 is a section like the left end of FIG. 2, but drawn to larger scale;

FIG. 8 is explanatory of one method of use of the flow control unit for control of an actuator cylinder;

FIG. 9 shows two units used for proportioned mixing;

FIG. 10 is a plan view of a closed unit;

FIG. 11 is a partially sectioned elevation of the same;

FIG. 12 is a transverse section taken approximately on the line 12—12 of FIG. 10, through the block alone;

FIG. 13 is a flow diagram using the closed unit of FIGS. 10–13.

FIG. 14 is a plan view of an adjustable flow control having two restrictors;

FIG. 15 is a fragmentary section taken approximately in the plane of the stepped line 15—15 of FIG. 14;

FIG. 16 is an end view looking toward the left end of the block assembly shown in FIG. 14;

FIG. 17 is a flow curve explanatory of the operation when using multiple restrictors;

FIG. 18 is a schematic diagram showing the use of three restrictors and a by-pass, and FIG. 19 is a modification of FIG. 18.

Referring to the drawing, and more particularly to FIG. 8, the adjustable flow control unit is generally designated 12. It controls the speed of movement of a piston 14 slidable in a cylinder 16, and having a piston rod 18 which is used to move a load generally designated 20. Hydraulic fluid is here shown supplied by a pump 22 which pumps the fluid from a tank 24 to a four-way valve 26 which may be conventional, and which supplies the fluid to one end or the other of the cylinder 16 through pipe 28 or 30. At the moment the actuator is moving from left to right, and pressure fluid is supplied through pipe 28.

The exhaust fluid is flowing through pipe 30 and four-way valve 26, and thence through pipe 32 to the inlet of our flow control device 12. The latter restricts the flow to a desired slow rate, and its outlet is connected through a pipe 34 back to the tank 24. Such an arrangement in which the restrictor is on the discharge or exhaust side is sometimes referred to as a "meter out" arrangement. It has the advantage of locking the position of the actuator as its moves along. Thus, as applied to the table of a milling machine, the machine could be used even for so-called "climb milling," in which the cutter is rotated in that direction which would tend to move the work ahead undesirably, if it were not restrained.

Referring now to FIGS. 1 and 2 of the drawing, the flow control 12 comprises an adjustable pressure regulator designated 40, and a restrictor generally designated 42. The pressure regulator has a manually operable means, in this case, a knurled knob 44, to adjust the same over a desired and preferably wide range. The restrictor 42 is a friction tube of large enough bore to avoid clogging, and long enough for very low rate of flow. In the specific example shown the bore is 1/16 inch and the tube is fifty inches long, which makes possible a flow rate down to say 0.06 cubic inch per minute. The rate may be made even less by lengthening the friction tube, without reducing the bore of the tube and therefore without danger of clogging.

The unit is preferably provided with a pressure gauge 46. This is so connected in the unit as to indicate the pressure existing between the adjustable regulator 40 and the restrictor 42. The gauge then may be used as an indication of the rate of flow as adjusted by the regulator 40.

As so far described the maximum rate of flow would be rather limited because above a pressure of say forty p.s.i. there is erratic change in flow with an increase in pressure. In the complete unit here shown, we additionally provide a by-pass regulator 48. This is a valve so connected in the unit that when opened it permits a flow of fluid around or in shunt with the restrictor 42, and thus provides a high rate of flow. The rate is still adjusted by the adjustable pressure regulator 40, and in the particular example illustrated, the regulator 40 has a range of from say zero to 60 p.s.i. The by-pass regulator 48 remains closed in a lower range of from say zero to forty p.s.i., and then opens an amount proportional to the increase in pressure. With this combination, and assuming a supply to adjustable regulator 40 of say one hundred p.s.i., the range of flow may be extended from the lower limit of 0.06 cubic inch per minute previously mentioned, all the way up to say 160 cubic inches per minute.

The operation so far described is made sensitive and accurately reproduceable when the adjustable regulator 40 receives fluid within a range from its setting to a reasonably higher pressure value. In the illustrated example this higher value has been established at one hundred p.s.i., and in accordance with the present invention, the complete unit preferably is provided with a preliminary pressure regulator generally designated 50. The inlet 52 then may receive hydraulic fluid at a pressure ranging all the way up to as much as say 3000 p.s.i., and yet the device will function as intended.

A high inlet pressure, without the preliminary pressure reduction, would spoil the sensitivity of operation of the main adjustable pressure regulator 40. With the valve ball seating on say a 1/8" passage, the regulator 40 responds to a differential of say one p.s.i., whereas with an inlet pressure of say 3000 p.s.i., and without the preliminary reduction in pressure, a differential of say 30 p.s.i. may be needed to open the regulator 40. This of course would not be sensitive enough and would not be acceptable for the present purpose. On the other hand, if the inlet pressure were known to be low, say 100 p.s.i., the preliminary pressure regulator 50 would not be needed.

Considering the structure in greater detail, the preliminary pressure regulator 50 may be described with reference to FIG. 6 of the drawing. The hydraulic fluid is received through a passage 54 in block 56. There is a ball 58 which closes against a seat 60 when the pressure is excessive. A light follower spring 62 helps seat the ball 58, but exerts only negligible force compared to the main spring 64. The latter is housed in a piston 66 sealed by an O-ring 68, and urged upward by main spring 64. At its lower end the main spring seats on a disc 70 held in position by means of an outwardly expanding snap ring 72. The piston 66 is formed integrally with a pin 74 which bears upward on the ball 58 when the outlet pressure falls below the desired delivery pressure, which in this case is 100 p.s.i. The pin 74 is smaller than its hole, which then acts as a flow passage around the pin.

The assembly is completed by means of a threaded plug 76 screwed into the block at 78, and sealed by a gasket 80. The plug 76 is recessed to receive the follower spring 62, and its cap 82 which is disposed between the spring 62 and the ball 58.

The adjustable pressure regulator 40 may be described with reference to FIGS. 2 and 6 of the drawing. This regulator is inverted compared to the preliminary regulator 50. It comprises a ball 84 which seats upward against a seat. It is urged toward the seat by a light compression spring 88 (FIG. 6) housed in a threaded plug 90 which is screwed into block 56, and which is sealed by an O-ring 92. As before a cap 94 may be interposed between the follower spring 88 and ball 84.

The main spring of regulator 40 is shown at 96 (FIG. 2). It is housed in a hollow screw 98 which is substantial in length in order to provide a wide range of adjustment, and which is rotated by the manually operable knurled knob 44 formed at its upper end. Adjusting screw 98 is threadedly received in a housing 100, and the adjustment may be locked by means of a threaded lock ring or nut 102, which also preferably is knurled on the outside. The housing 100 has a flange 104 at its lower end, and is seated in block 56, and is there secured by means of an expansion ring 106.

Housing 100 is a cylinder carrying a piston 108. The housing is preferably lined with a fixed bearing 110, this preferably being an oil-impregnated or self-lubricating bushing. The piston 108 is urged downward by the main spring 96, and carries a valve pin 112 which bears against ball 84, and so opens the regulator when the pressure beneath piston 108 falls below the desired predetermined value.

The pin 112 is preferably slightly movable laterally. (This feature is far more important in the by-pass regulator 48, described later, but many parts are made interchangeable.) The upper end of pin 112 is secured to or formed integrally with the disc 114 (FIG. 6) which constitutes a large area head with a smooth flat top which is slidable laterally on the flat piston surface 116. The head 114 is made smaller in diameter than the recess in which it is received, to afford lateral movement. The head is held by a snap ring 118, which causes the valve pin 112 to move axially with piston 108, without however preventing lateral sliding movement.

To prevent leakage the adjustable regulator is provided with a flexible seal 120 (FIG. 6). This is essentially a diaphragm, but is backed over substantially its entire area and therefore functions more as a seal rather than as a diaphragm as usually used. It has a flange 122 which is clamped between the block 56 and the cylinder 100. It has a hole at the center for passage of the pin 112, but the pin fits the hole tightly. A metal disc or washer 124 is disposed between the snap ring 118, and the main area of seal 120, thereby supporting or backing the seal over its entire area. The hole in disc 124 is somewhat larger than the pin 112. The seal 120 is preferably thickened with a cylindrical portion at 126, and the lower peripheral edge of piston 108 may have a rounded ridge 128 against which the seal bears when under pressure. It will be understood that the vertical motion of the piston is very slight, say 0.025 inch, and consequently the flexing of the seal is very slight, and is accommodated by a slight inward turning of the cylindrical part 126 of the seal.

In practical effect the piston assembly comprises the piston 108, the snap ring 118, and the washer or disc 124, and thus the diaphragm 120 is substantially fully backed by the piston.

The by-pass regulator or valve may be described with reference to FIG. 2 of the drawing. Some parts resemble those used in the adjustable pressure regulator last described. There is a main spring 130 compressed beneath a cap 132 threadedly received in a housing 134. The housing is flanged at its lower end at 136 and is locked in a mating recess in block 56 by means of an expansion snap ring 138. The housing 134 acts as a cylinder for a vertically movable piston 140, and the housing is preferably fixedly lined with an oil-impregnated or self-lubricating bushing 142.

The piston 140 carries a valve pin 144 having a rounded lower end which bears directly against and closes a valve seat 146. The pin is self-adjustable laterally to insure accurate seating on its seat 146, and for this purpose the pin is secured to or formed integrally with a large area head 148 with a smooth flat top which is slidable laterally on a smooth piston surface 150. The diameter of head 148 is somewhat less than the recess in piston 140 in order to permit this lateral movement. The head is held in the recess by a snap ring 152.

The piston is sealed by a diaphragm-like seal 156 the same as that previously described, and similarly secured between the housing 134 and the block 56. A disc or washer 154 similarly fills the space between snap ring 152 and the main area of the seal 156. The motion is small, say 0.035 inch. The upper left portion of FIG. 6 may be referred to for the construction of these parts, although FIG. 6 shows the adjustable pressure regulator rather than the by-pass regulator.

The adjustment of cap 132 is by means of a tool, because its adjustment usually remains fixed, once the assembly has been completed and tested or calibrated.

The restrictor 42 may be described with reference to FIGS. 2 and 7 of the drawing. The friction tube is preferably made of a reasonable pliable metal, typically copper, and is coiled helically about the shank 160 of a metal core having a cylindrical head 162 which is larger in diameter than the coil. The head 162 has three annular grooves 164, 166 and 168. The outer grooves 164 and 168 have O-rings 170. The middle groove 166 has a hole 172 which leads to the inner end 174 of the coiled tube. More specifically, the end 174 is inserted in a mating hole 176, which hole intersects hole 172. The coil end 174 is brazed or soldered in hole 176, following which the core may be rotated in a winding machine or lathe to form the helical coil. In the present case the coil has two layers, the tube being wound from the head toward the end 178 of shank 160 to form the inner layer, and then wound back again to form the outer layer. This outer layer ends with the tube open, as is indicated at 180 in FIG. 7.

The restrictor unit is slid into a cylindrical chamber 182 formed in the block 56, and is held in the chamber by means of an expansion snap ring 184. The length of shank 160 is made such that it just meets the inner end of the chamber when the snap ring 184 is put in position, thus holding the restrictor coil against axial movement. This aligns the middle annular groove 166 with a mating slot in the block 56. The slot is shown at 186 in FIGS. 1, 3, and 4, and the latter shows its arcuate configuration. The slot is machined deeply enough to reach a horizontal flow passage 188 which supplies hydraulic fluid from the adjustable regulator to the restrictor. Another flow passage shown at 190 in FIGS. 1 and 3, leads from the chamber 182 to the outlet 192.

In the present structure all parts of the adjustable flow control are mounted on a single block of metal 56, and the internal connections are formed by drilling or milling passages in the block. Referring to FIGS. 1, 3, 5 and 6, the inlet is at 52, this having a pipe thread, and communicating by hole 54 with the upper chamber 200 of the preliminary pressure regulator. The lower chamber 201 of the regulator communicates tangentially with a horizontal passage 202 (FIG. 2), the open end of which is permanently plugged at 204 (FIGS. 2 and 5). The inner end of passage 202 communicates with the lower or inlet chamber 206 of the adjustable pressure regulator 40. That, in turn, is connected at vertical hole 208 with a long horizontal passage 210, the vertical hole 208 communicating with the upper chamber of the regulator 40. The outer or right end of passage 210 is permanently plugged at 212. A vertical hole 214 (FIGS. 1, 3 and 5) leads to the internally threaded socket 216 which receives the shank of the pressure gauge 46. Thus the pressure gauge indicates the discharge pressure of the adjustable pressure regulator 40, which is also the pressure existing between the adjustable pressure regulator on the one hand, and the restrictor 42 and the by-pass regulator 48 on the other hand.

The horizontal passage 210 leads at its left end into the chamber 218 of the by-pass regulator 48. The periphery of that chamber connects with an offset horizontal passage 188 (FIG. 3) the left or free end of which is permanently plugged at 220. It will be recalled that passage 188 intersects the arcuate slot 186 (FIGS. 3 and 4), which in turn registers with the middle groove 166 (FIGS. 2 and 7) of the restrictor unit.

With the by-pass regulator closed the flow is through the restrictor tube, with its discharge at open end 180 (FIG. 7), thereby filling the cylindrical chamber 182 in which the restrictor is housed. The discharge then is through short transverse horizontal passage 190 from chamber 182 to the threaded outlet 192. The inlet 52 and outlet 192 may have conventional tapered pipe threads.

When the by-pass valve or regulator opens the ensuing flow is downward through vertical hole 222 (FIGS. 2 and 3) which intersects a short horizontal passage 224, which leads into the end of the chamber 182. The by-pass flow then continues outward through horizontal passage 190 and outlet 192, as previously mentioned. Some flow continues through the restrictor tube, to the chamber 182 and outlet 192, as before.

The two vertical holes shown at 226 in FIGS. 1 and 3 are simply holes for screws which secure the block to the machine on which it is being used.

It will be understood that while we have described the invention as applied to flow control for hydraulic fluid operating a machine, the invention also may be used for flow control to meter a quantity of fluid, or to meter the mixing of two or more different fluids in desired proportion.

Referring to FIG. 9, fluid from tank 300 is pumped by pump 302 through a flow control unit 304. At the same time a different fluid from tank 306 is pumped by pump 308 through a flow control unit 310. The deliveries are mixed at 312 and the mixture flows into a tank 314. The mixture ratio may be accurately adjusted and is maintained constant by our improved flow control units 304 and 310.

The supply of fluid would ordinarily not be at the high pressures used in hydraulic machines, and therefore auxiliary features such as the preliminary pressure regulator described above may not be needed when mixing fluids at moderate pressure.

As so far described, it has been assumed that the regulator is open to atmospheric pressure. The upper chamber of the adjustable regulator 40 (FIG. 2) and of the by-pass regulator 48 are at atmospheric pressure, as is also the lower chamber of the preliminary pressure regulator 50. Referring to FIG. 8, the discharge from the unit is at atmospheric pressure, and the same applies to FIG. 9.

There are situations in which the discharge may be under pressure instead of being open to the atmosphere. One example is when using the regulator for a "meter-in" connection to an actuator, as shown in FIG. 13, in which the regulator unit 320 is connected between the pump P and the four-way valve 322 leading to actuator cylinder 324. Another example would be a mixing system as in FIG. 8, but with the discharge into a closed tank which is under pressure, instead of into an open tank. Even when using the regulator unit as a "meter-out" device, as in FIG. 8, there is value in providing a closed regulator unit, as next described, because the regulation then is made independent of possible obstruction to the discharge, which obstruction would raise the outlet pressure above atmospheric, and so change the operation of the regulators.

FIGS. 10, 11, and 12 show a modified regulator which is much like that previously described, except that the low pressure chambers of the regulators are connected to the outlet, so that the regulators are subjected to a differential pressure relative to the outlet pressure. The mechanisms in the regulators are the same as previously described. Referring to FIG. 11, the upper part of housing 326 is modified to provide a cylindrical seal portion 328 with an O-ring seal 330. The regulator screw 332 is modified to provide a cylindrical part 334 above the lower threaded part 336, for sliding engagement with the O-ring 330.

The resulting closed or sealed chamber has an opening 338 connected by means of a pipe 340 which leads around the by-pass regulator and then turns downward for connection at hole 342 (FIG. 10) to the restrictor chamber 344. The latter corresponds to chamber 182 in FIGS. 1 and 2, in which the chamber was at atmospheric pressure. In FIG. 11 it may be at an elevated pressure.

The housing 346 of the by-pass regulator similarly is provided with a cylindrical part 348 and an O-ring seal 350. The adjusting screw again has a cylindrical part 352 for sliding but sealed engagement with the O-ring 350. The resulting sealed housing has a lateral opening 354 connected by a short bent pipe 356 to a hole 358 leading into the restrictor chamber 344.

The preliminary pressure regulator has its lower chamber sealed by a plate 360 secured to the bottom of the block by means of four corner screws. The plate 360 has an annular groove carrying an O-ring 362, best shown in FIG. 12. The regulator mechanism is omitted from the resulting sealed chamber 364, but may be the same as previously described. The sealed chamber 364 is connected to the outlet by means of passages drilled in the block, and referring to FIGS. 10 and 11, the main passage is shown at 366, it extending longitudinally of the block from the restrictor chamber 344 to an intersecting short transverse passage 368. The latter leads into chamber 364, and may be disposed at an angle to facilitate a drilling operation from chamber 364, as shown in FIG. 12. The longitudinal passage 366 may be drilled through the restrictor chamber 344.

With this arrangement each regulator is subjected to only the differential or the pressure above the outlet pressure. Thus, in FIG. 13, even if the outlet pressure in pipe 360 is very high, the differential pressure may be small. The present unit separates the pressure factor from the flow factor, and the latter depends primarily on the differential pressure. The differential pressure across each regulator, and across the restrictor tube, may be kept the same no matter what the outlet pressure may be.

It may be mentioned that if it were certain that the unit would be used solely in a "meter-in" arrangement such as that shown in FIG. 13, the preliminary pressure regulator might be eliminated. However, it is preferred to retain it so that the unit will be more generally usable. As here shown it may be used to meter-in, in which case the drop across the preliminary regulator may be only say 1000 p.s.i., or it may be used as in FIG. 8 to meter-out in which case the drop across the preliminary pressure regulator may be several thousand p.s.i., with a delivery pressure of say 100 p.s.i. regardless of the supply pressure. Another advantage of the preliminary regulator is in changing a variable supply to a uniform delivery. For example, two thousand p.s.i. supply may be wanted for a "meter-in" arrangement, but the supply pressure may vary, and at times may be twenty-two hundred or more. The first regulator then has the value that any pressure regulator would have in a supply line, it being set for 2000 p.s.i.

The pressure gauge shown at 372 in FIGS. 10 and 11, if exposed to the atmosphere, should have a high range. It is also possible and better to employ a differential pressure gauge having two connections, in which case the second connection is led to the outlet. By enlarging the block somewhat it is feasible to recess a small pressure gauge in a chamber in the block, the said chamber being sealed by a transparent cover, and the said chamber being connected to the passage 366 and thence to the outlet. In such case, the pressure gauge, like the regulators, is subjected to only the differential pressure, and may be used over a low range as described earlier.

As so far described, the regulator unit has employed only one restrictor tube, and for increased range a by-pass regulator has been employed. However, for gradual adjustment over a wider range, an additional restrictor tube may be employed, controlled by an additional pressure regulator or valve which opens after the flow through the first restrictor tube has reached a desired value. Such an arrangement is shown in FIGS. 14–16, referring to which the block 420 is much like the block 320 shown in FIGS. 10–12, and is similarly provided with a preliminary pressure regulator generally designated 422; an adjustable pressure regulator generally designated 424; a by-pass regulator which in this case may be called a transfer regulator, generally designated 426; and a helical restrictor tube (not shown) housed in a restrictor chamber 428.

The restrictor may be identical with that shown in FIG. 2. It is similarly supplied through a passage 430 (the left end of which is plugged) and through an arcuate slot 432 which registers with the peripherally grooved head of the restrictor, and similarly discharges through a transverse outlet passage 434. The transfer regulator 426 differs from before in that instead of discharging longitudinally into chamber 428 (as by means of passage 224 shown in FIG. 2), it discharges transversely through a horizontal passage best shown at 436 in FIG. 16. The upper chamber also has a transverse passage 456.

Block 420 is supplemented by an additional block 440 secured to block 420, as by means of bolts 442. Block 440 has a restrictor chamber 444, which in the present case is dimensioned the same as chamber 428, and receives another restrictor tube like that previously described. For connection to the restrictor tube, the transverse horizontal passage 436 leads to a longitudinal horizontal passage 446, the left end of which is plugged, and which connects to an arcuate slot 448 which leads into the peripherally grooved head of the restrictor tube, as previously described. The discharge from the restrictor tube is into the chamber 444, and thence through passage 450 to outlet 452. The transverse passage 434 previously referred to extends from chamber 428 to chamber 444 and therefore also connects to the outlet 452.

Block 40 may itself carry a by-pass regulator 454, the inlet to which is from the upper chamber of transfer regulator 426, through a passage 456, and the outlet from the lower chamber of which is through a short longitudinal passage 458 into the end of the restrictor chamber 444 and thence to the outlet 452.

Assuming a smooth working range without turbulence up to a pressure of say forty p.s.i., the transfer regulator 426 may be set to open at a lower value, say twenty p.s.i. In such case, the flow is through the first restrictor in a pressure range up to twenty p.s.i., whereupon the transfer regulator opens and the flow then is through both restrictors, at a faster rate, up to a pressure of forty p.s.i. Referring to FIG. 17, the initial flow through one restrictor is indicated by line 460, and the increased flow through both restrictors is indicated by line 460, and the increased flow through both restrictors is indicated by line 462. The flow at 464 then is about double what it would have been with one restrictor. Thereafter, when the by-pass regulator 454 opens, there is a steep increase in flow indicated by line 466.

If desired, three restrictors may be employed, and this is schematically indicated in FIG. 18, in which the main adjustable flow regulator is shown at 470 and supplies a first restrictor 472, and first and second transfer regulators 474, 478, and a by-pass regulator 482. When regulator 474 opens, it supplies a second restrictor 476. Transfer regulator 478 is set at a higher pressure than transfer regulator 474, and when the second transfer regulator opens it supplies a third restrictor 480. The by-pass regulator 482 is set to open at a higher pressure than the second transfer regulator, and when it opens there is a flow through open passage 484 to the outlet. It will be understood that all three restrictors and passage 484 preferably lead to a common outlet (as shown at 452 in FIG. 14).

To structurally embody the arrangement of FIG. 18, another block somewhat like block 440 may be inserted between block 440 and block 420, with appropriate passages.

In FIG. 14 the transverse connecting passages are sealed by the provision of O-rings 486 and 488 (and a third O-ring not visible in FIG. 14) around the three transverse passages, and similar O-rings may be provided between additional blocks. A single larger block may be employed, instead of an assembly of smaller blocks as here shown.

It is not essential that the restrictors be alike. The second restrictor may be a shorter tube, providing increased flow, in which case the line 462 shown in FIG. 17 would be steeper than there shown. Even the first restrictor may be shorter than was described above if the very slow minimum flow of, say, 0.06 cubic inch per minute is not needed, and in such case the upper pressure limit and the flow range would be increased. In general, different combinations of restrictors and pressure adjustments may be employed to obtain almost any desired flow rate curve.

As so far described, the pressure regulator could be non-enclosed, as in FIG. 2, and is used with its discharge at atmospheric pressure as shown in FIGS. 8 and 9. However, in preferred form the regulator of FIG. 14 also is a closed regulator, and for that purpose the preliminary pressure regulator 422 is sealed by a bottom plate 421, as in FIGS. 10–12, with an appropriate differential-pressure connection through block 420 to the restrictor chamber 428. Similarly, the adjustable pressure regulator 424 is sealed at the top (as shown in FIG. 11) and is connected to restrictor chamber 428 by means of a pipe 490 (FIG. 14). Also, the transfer regulator 426 has its upper chamber sealed (as shown in FIG. 11) and is connected to restrictor chamber 428 by means of a pipe 492 (FIG. 14). Likewise, the by-pass regulator 454 is sealed at the top (as in FIG. 11) and is connected to the second restrictor chamber 444 by means of a pipe 494 (FIGS. 14 and 15). If an additional transfer regulator is employed as shown at 478 in FIG. 18, it too is provided with a differential-pressure connection, like the pipe connection shown at 492 in FIG. 14.

Inasmuch as each transfer regulator is set at a higher pressure than the preceding one, a multiple restrictor arrangement may be connected as shown in FIG. 19 instead of as shown in FIG. 18. In FIG. 19 the adjustable regulator 486 supplies a first restrictor 488 and a transfer regulator 490, as before. However, the next transfer regulator 492 is connected to the discharge chamber instead of the inlet chamber of transfer regulator 490, so that the latter supplies the second restrictor 494 and the second transfer regulator 492. Similarly the by-pass regulator 496 which is set at a still higher pressure is connected to the discharge chamber instead of the inlet chamber of transfer regulator 492, and the latter then supplies the third restrictor 498 as well as the by-pass regulator 496. Either flow arrangement may be employed, depending on structural convenience.

It is believed that the construction and method of assembly, as well as the operation and advantages of our improved adjustable flow control, will be apparent from the foregoing detailed description. It affords a very small flow displacement down to say 0.06 cubic inch per minute, without the danger of clogging, and while using oil of ordinary quality and filtration. Heretofore, a practical minimum flow with a needle valve (or an equivalent rotatable eccentric throttle) was considered to be about five cubic inches per minute, and thus an actuator cylinder required to move slowly might be designed with a diameter of say four or five inches when, from the viewpoint of the force required, a diameter of an inch or less would be more than enough. The present device therefore makes it feasible to use very small bore cylinders. The adjustment of flow rate is infinitesimally variable over the entire range of adjustment, and a change of adjustment may be made during operation. A previous setting can be accurately duplicated with the aid of the pressure gauge. The selected rate of flow is not affected by changes in the incoming line pressure even though varied over a very wide range of say up to 3000 p.s.i. Oil contamination resulting from natural wear of equipment does not affect the operation. It is nearly tamperproof, and is readily installed in any hydraulic system between the return side of the actuator cylinder and the tank. A high flow rate may be provided with the aid of the by-pass regulator. This may not be needed in some cases, but when provided adds greatly to the versatility of the unit by giving it a very wide range of adjustment.

Although certain quantitative pressure values and dimensions have been mentioned above, this has been done solely by way of example, and is not intended to be in limitation of the invention.

It will be understood that while we have shown and described the invention in a preferred form, changes may be made without departing from the scope of the invention as sought to be defined in the following claims. In the claims the reference to the restrictor being a friction tube is not intended to exclude a long passage no matter how obtained, as by forming a passage in solid material, instead of literally using a tube.

We claim:

1. An adjustable flow control for metered flow of fluid, said flow control comprising an adjustable pressure regulator, a by-pass regulator, and a restrictor connected to the outlet of said adjustable pressure regulator said adjustable pressure regulator having a manually operable means to adjust the same over a desired pressure range, said restrictor being a friction tube of large enough bore to avoid clogging, and long enough for very low rate of flow, said by-pass regulator being adjusted to open and to thereby afford flow around said restrictor for rates of flow higher than is afforded by the restrictor, the rate of flow through the restrictor being adjusted by means of the adjustable pressure regulator preceding the restrictor.

2. An adjustable flow control as defined in claim 1 in which the by-pass regulator comprises a piston backed by an adjustable compression spring and carrying a valve pin the free end of which is shaped to close a valve seat, the opposite end of said pin having a large area head with a flat top which is slidable laterally on the piston surface and which has clearance for such lateral sliding movement, and means holding said head in said piston so that the pin moves with the piston in axial direction.

3. An adjustable flow control as defined in claim 1, in which the low pressure side of the adjustable pressure regulator and the low pressure side of the by-pass regulator are connected to the outlet of the restrictor, so that the regulators are subjected to a differential pressure and their action is independent of the outlet pressure.

4. An adjustable flow control as defined in claim 1, in which there is a second restrictor, and a transfer regulator between the adjustable pressure regulator and the second restrictor, and in which the by-pass regulator affords flow around the second restrictor, and in which the transfer regulator is adjusted to a pressure value below that at which the by-pass regulator is set.

5. An adjustable flow control as defined in claim 1, in which there are a plurality of restrictors, and a plurality of transfer regulators, a transfer regulator being in series with each restrictor except the first, and the by-pass regulator affording flow around the last restrictor, the last transfer regulator being set at a pressure value lower than that of the by-pass regulator, and each preceding transfer regulator being set at a pressure value lower than that of the succeeding regulator.

6. An adjustable flow control for metered flow of fluid, said flow control comprising a preliminary pressure regulator, an adjustable pressure regulator, and a restrictor connected to the outlet of said adjustable pressure regulator, said preliminary pressure regulator being adjusted to reduce a supply pressure which may be much greater than a desired working pressure down to the desired working pressure, for delivery to the adjustable pressure regulator, said adjustable pressure regulator having a manually operable means to adjust the same over a desired pressure range, and said restrictor being a friction tube of large enough bore to avoid clogging, and long enough for very low rate of flow through the restrictor, the rate of flow being adjusted by means of the adjustable pressure regulator preceding the restrictor.

7. An adjustable flow control as defined in claim 6, in which the low pressure side of the adjustable pressure regulator, and the low pressure side of the preliminary pressure regulator are connected to the outlet of the restrictor, so that the regulators are subjected to a differential pressure and their action is independent of the outlet pressure.

8. An adjustable flow control as defined in claim 6, in which there is a second restrictor, and a transfer regulator between the adjustable pressure regulator and the second restrictor, said transfer regulator being set at a pressure value below the pressure value at which the flow response through the first restrictor becomes erratic.

9. An adjustable flow control for metered flow of fluid, said flow control comprising a preliminary pressure regulator, an adjustable pressure regulator, a by-pass regulator, and a restrictor, connected to the outlet of said adjustable pressure regulator, said preliminary pressure regulator being adjusted to reduce a supply pressure which may be much greater than a desired working pressure down to the desired working pressure, for delivery to the adjustable pressure regulator, said adjustable pressure regulator having a manually operable means to adjust the same over a desired pressure range, and said restrictor being a friction tube of large enough bore to avoid clogging, and long enough for very low rate of flow, said by-pass regulator being adjusted to open and thereby to afford flow around said restrictor for rates of flow higher than is afforded by the restrictor, the rate of flow through the restrictor being adjusted by means of the adjustable pressure regulator preceding the restrictor.

10. An adjustable flow control as defined in claim 9, in which the low pressure side of the adjustable pressure regulator, and the low pressure side of the by-pass regulator, and the low pressure side of the preliminary pressure regulator, are all connected to the outlet of the restrictor, so that the regulators are subjected to a differential pressure and their action is independent of the outlet pressure.

11. An adjustable flow control as defined in claim 9, in which there is a second restrictor, and a transfer regulator between the adjustable pressure regulator and the second restrictor, and in which the by-pass regulator affords flow around the second restrictor, and in which the transfer regulator is adjusted to a pressure value below that at which the by-pass regulator is set.

12. An adjustable flow control as defined in claim 9, in which there are a plurality of restrictors, and a plurality of transfer regulators, a transfer regulator being in series with each restrictor except the first, and the by-pass regulator affording flow around the last restrictor, the last transfer regulator being set at a pressure value lower than that of the by-pass regulator, and each preceding transfer regulator being set at a pressure value lower than that of the succeeding regulator.

13. An adjustable flow control for metered flow of fluid, said flow control comprising an adjustable pressure regulator, a by-pass regulator, and a restrictor, connected to the outlet of said adjustable pressure regulator, said adjustable pressure regulator having a manually operable means to adjust the same over a desired differential pressure range of from say zero to 60 p.s.i., said restrictor being a friction tube of large enough bore to avoid clogging, and long enough for very low rate of flow, said by-pass regulator being adjusted to open and to thereby afford flow around said restrictor for rates of flow higher than is afforded by the restrictor, say at differential pressures from 40 to 60 p.s.i., the rate of flow through the restrictor being adjusted by means of the adjustable pressure regulator preceding the restrictor.

14. An adjustable flow control for metered flow of hydraulic fluid for machine control purposes, said flow control comprising an adjustable pressure regulator, a by-pass regulator, a restrictor connected to the outlet of said adjustable pressure regulator, and a pressure gauge, said adjustable pressure regulator having a manually operable means to adjust the same over a desired pressure range, said restrictor being a friction tube of large enough bore to avoid clogging, and long enough for very low rate of flow, said by-pass regulator being adjusted to open and to thereby afford flow around said restrictor for rates of flow higher than afforded by the restrictor, and said pressure gauge being connected to indicate the pressure between said adjustable regulator and said by-pass regulator, whereby the pressure gauge may be used as a measure of the rate of flow as adjusted by the adjustable pressure regulator.

15. An adjustable flow control for metered flow of fluid, said flow control comprising a preliminary pressure regulator, an adjustable pressure regulator, and a restrictor connected to the outlet of said adjustable pressure regulator, said preliminary pressure regulator being adjusted to reduce a supply pressure which may be much greater than a desired working pressure down to the desired working pressure, say 100 p.s.i., for delivery to the adjustable pressure regulator, said adjustable pressure regulator having a manually operable means to adjust the same over a desired pressure range of from say zero to 60 p.s.i., and said restrictor being a friction tube of large enough bore to avoid clogging, and long enough for very low rate of flow, the rate of flow through the restrictor being adjusted by means of the adjustable pressure regulator preceding the restrictor.

16. An adjustable flow control for metered flow of hydraulic fluid for machine control purposes, said flow control comprising a preliminary pressure regulator, an adjustable pressure regulator, a restrictor connected to the outlet of said adjustable pressure regulator, and a pressure gauge, said preliminary pressure regulator being adjusted to reduce a supply pressure which may be much greater than a desired working pressure down to the desired working pressure, for delivery to the adjustable pressure regulator, said adjustable pressure regulator having a manually operable means to adjust the same over a desired pressure range, said restrictor being a friction tube of large enough bore to avoid clogging, and long enough for very low rate of flow, and said pressure gauge being connected to indicate the pressure between said adjustable regulator and said restrictor, whereby the pressure gauge may be used as a measure of the rate of flow as adjusted by the adjustable pressure regulator.

17. An adjustable flow control for metered flow of fluid, said flow control comprising a preliminary pressure regulator, an adjustable pressure regulator, a by-pass regulator, and a restrictor connected to the outlet of said adjustable pressure regulator, said preliminary pressure regulator being adjusted to reduce a supply pressure which may be much greater than a desired working pressure down to the desired differential working pressure, say 100 p.s.i. for delivery to the adjustable pressure regulator, said adjustable pressure regulator having a manually operable means to adjust the same over a desired differential pressure range of from say zero to 60 p.s.i., and said restrictor being a friction tube of large enough bore to avoid clogging, and long enough for very low rate of flow, said by-pass regulator being adjusted to open and thereby to afford flow around said restrictor for rates of flow higher than is afforded by the restrictor, say at differential pressures from 40 to 60 p.s.i., the rate of flow through the restrictor being adjusted by means of the adjustable pressure regulator preceding the restrictor.

18. An adjustable flow control for metered flow of hydraulic fluid for machine control purposes, said flow control comprising a preliminary pressure regulator, an adjustable pressure regulator, a by-pass regulator, a restrictor connected to the outlet of said adjustable pressure regulator, and a pressure gauge, said preliminary pressure regulator being adjusted to reduce a supply pressure which may be much greater than a desired working pressure down to the desired working pressure, for delivery to the adjustable pressure regulator, said adjustable pressure regulator having a manually operable means to adjust the same over a desired pressure range, said restrictor being a friction tube of large enough bore to avoid clogging, and long enough for very low rate of flow, said by-pass regulator being adjusted to open and thereby to afford flow around said restrictor for rates of flow higher than is afforded by the restrictor, and said pressure gauge being connected to indicate the pressure between said adjustable regulator and said by-pass regulator, whereby the pressure gauge may be used as a measure of the rate of flow as adjusted by the adjustable pressure regulator.

19. An adjustable flow control for metered flow of fluid, said flow control comprising a friction tube of large enoug bore to avoid clogging, and long enough for very low rate of flow, said friction tube being a helix coiled about the shank of a core having a cylindrical head larger in diameter than the coil, said head having three annular grooves, the two outer grooves having O-rings, the middle groove having a hole leading to one end of the coiled tube, the other end of the tube being open, said coil and core assembly being slid into a cylindrical chamber in a block, means holding said assembly in said chamber, a flow passage in said block leading to the middle groove, and another flow passage in said block leading to said chamber.

20. An adjustable flow control for metered flow of fluid, said flow control comprising a block carrying an adjustable pressure regulator, and a restrictor, said adjustable pressure regulator having a manually operable means to adjust the same over a desired pressure range, and said restrictor being a friction tube of large enough bore to avoid clogging, and long enough for very low rate of flow, the rate of flow being adjusted by means of the adjustable pressure regulator, said friction tube being a helix coiled about the shank of a core having a cylindrical head larger in diameter than the coil, said head having a hole leading to one end of the coiled tube, the other end of the tube being open, said coil and core assembly being received in a cylindrical chamber in said block, means holding and sealing the head of said assembly in said chamber, a flow passage in said block leading to the hole in the head, and another flow passage in said block leading to said chamber.

21. An adjustable flow control for metered flow of fluid, said flow control comprising a block carrying an adjustable pressure regulator, a by-pass regulator, and a restrictor, said adjustable pressure regulator having a manually operable means to adjust the same over a desired pressure range, and said restrictor being a friction tube of large enough bore to avoid clogging, and long enough for very low rate of flow, said by-pass regulator being adjusted to open and thereby to afford flow around said restrictor for rates of flow higher than is afforded by the restrictor, the rate of flow being adjusted by means of the adjustable pressure regulator, said friction tube being a helix coiled about the shank of a core having a cylindrical head larger in diameter than the coil, said head having three annular grooves, the two outer grooves having O-rings, the middle groove having a hole leading to one end of the coiled tube, the other end of the tube being open, said coil and core assembly being slid into a cylindrical chamber in said block, means holding said assembly in said chamber, a flow passage in said block leading to the middle groove, and another flow passage in said block leading to said chamber.

22. An adjustable flow control for metered slow flow of fluid, said flow control comprising an adjustable pressure regulator, and a restrictor connected to the outlet of said regulator, said regulator having a readily operable external control means to adjust the same over a desired pressure range, and said restrictor being a friction tube of large enough bore to avoid clogging, and long enough for very low rate of flow, the rate of flow through the restrictor being adjusted by means of the adjustable pressure regulator preceding the restrictor, and means connecting the low pressure side of the adjustable pressure regulator to the outlet of the restrictor, so that the regulator is subjected to a differential pressure and its action is independent of the outlet pressure.

23. An adjustable flow control for metered slow flow of fluid, said flow control comprising an adjustable pressure regulator, and a restrictor connected to the outlet of said regulator, said regulator having a readily operable external control means to adjust the same over a desired pressure range, and said restrictor being a friction tube of large enough bore to avoid clogging, and long enough for very low rate of flow, the rate of flow through the restrictor being adjusted by means of the adjustable pressure regulator preceding the restrictor, a second restrictor, and a transfer regulator between the adjustable pressure regulator and a second restrictor, said transfer regulator being set at a pressure value below the pressure value at which the flow response through the first restrictor becomes erratic.

24. An adjustable flow control for metered slow flow of fluid, said flow control comprising an adjustable pressure regulator, and a restrictor connected to the outlet of said regulator, said regulator having a readily operable external control means to adjust the same over a desired pressure range, and said restrictor being a friction tube of large enough bore to avoid clogging, and long enough for very low rate of flow, the rate of flow through the restrictor being adjusted by means of the adjustable pressure regulator preceding the restrictor, a plurality of additional restrictors, and a plurality of transfer regulators, a tansfer regulator being in series with each restrictor except the first, the last transfer regulator being set at a pressure value below that at which the flow response through a restrictor becomes erratic, and each preceding transfer regulator being adjusted to a pressure value lower than that of the succeeding transfer regulator.

References Cited

UNITED STATES PATENTS

| | | | |
|---|---|---|---|
| 1,079,600 | 11/1913 | Kennedy | 137—505.42 |
| 2,057,150 | 10/1936 | Kehl et al. | 137—505.12 |
| 2,608,209 | 8/1952 | Bryant | 137—501 |
| 2,824,573 | 2/1958 | Mason et al. | 251—126 |

WILLIAM F. O'DEA, *Primary Examiner.*

D. R. MATTHEWS, *Assistant Examiner.*